United States Patent

[11] 3,581,895

[72] Inventors Herbert H. Howard
 Encino;
 Henry R. Young, Arleta; Jack A. Berg,
 Encino; Bernard Bellinson, Sherman Oaks,
 all of, Calif.
[21] Appl. No. 803,244
[22] Filed Feb. 28, 1969
[45] Patented June 1, 1971
[73] Assignees said Herbert H. Howard and Henry R.
 Young, Marine Swimming Pool
 Equipment Co., North Hollywood, Calif.

[54] AUTOMATIC BACKWASHING FILTER SYSTEM FOR SWIMMING POOLS
10 Claims, 3 Drawing Figs.

[52] U.S. Cl. .................................................. 210/108,
 210/138, 210/169
[51] Int. Cl. .................................................. B01d 29/38
[50] Field of Search .......................................... 210/107,
 108, 322, 333, 169, 138, 413—415

[56] References Cited
UNITED STATES PATENTS

| | | | |
|---|---|---|---|
| 656,043 | 8/1900 | Paterson | 210/108 |
| 3,138,552 | 6/1964 | Richards | 210/138X |
| 3,169,109 | 2/1965 | Hirs | 210/138X |
| 3,253,431 | 5/1966 | Minhinnett | 210/138X |
| 3,365,064 | 1/1968 | Horan, Jr. | 210/169 |
| 3,471,021 | 10/1969 | Prizler | 210/169 |

*Primary Examiner*—John Adee
*Attorney*—Lynn H. Latta

ABSTRACT: A pressure-responsive switch senses the rising back pressure in a sand filter caused by debris collected in the filter, and at a predetermined pressure indicating the need for cleaning the filter, it triggers the reversal of valve means which reverses the flow in the filter and backwashes the debris into a separating tank where the debris is collected from the backwash flow which is then returned to the swimming pool. A timer controls the backwashing interval, at the end of which the valve is again reversed by a reversing mechanism, returning the system to normal filtering operation.

PATENTED JUN 1 1971  3,581,895
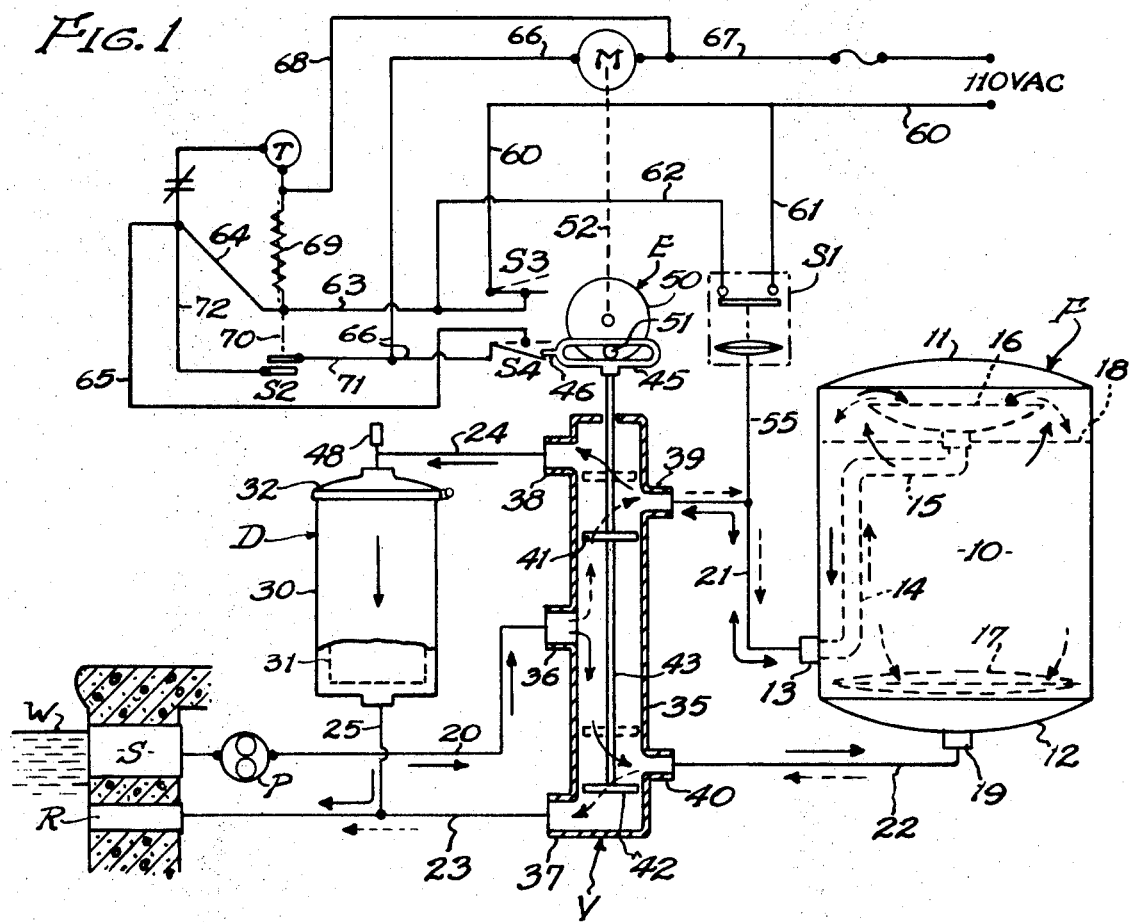
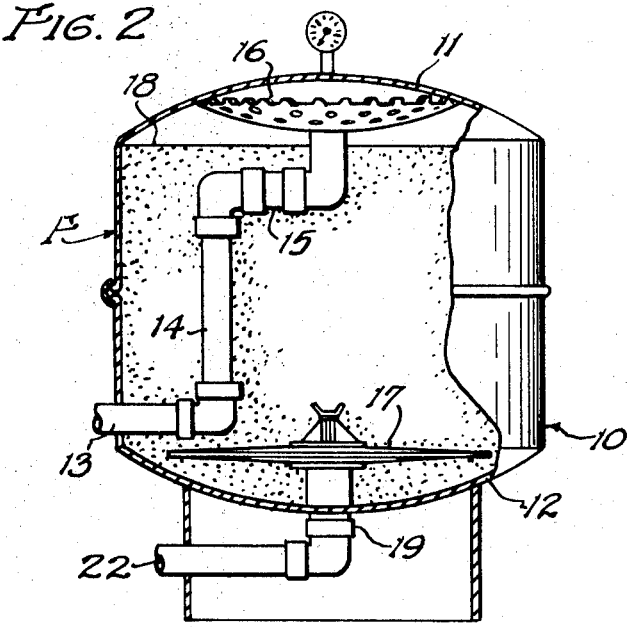
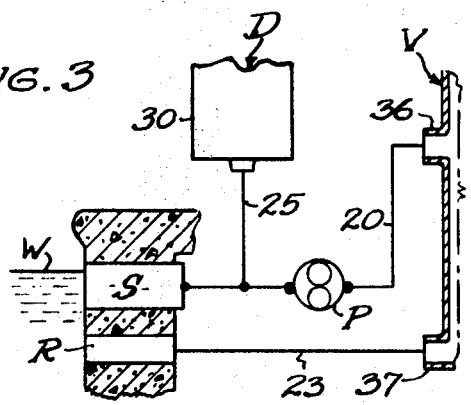
JACK A. BERG
BERNARD BELLINSON
HERBERT H. HOWARD
HENRY R. YOUNG
INVENTORS
BY Lynn H. Latta
—ATTORNEY—

3,581,895

AUTOMATIC BACKWASHING FILTER SYSTEM FOR SWIMMING POOLS

BACKGROUND OF THE INVENTION

Sand filters, in which debris and other foreign matter is collected on the upper surface and in the upper strata of a bed of sand, from a stream of water which passes downwardly through the sand and is then returned to the pool, have been widely used for many years in connection with swimming pools. It also has been common to utilize means for reversing the flow through the filter so as to backwash the accumulated debris out of the filter into a drain.

SUMMARY OF THE INVENTION

This invention improves upon such a filtering system (1) by providing a backwash circuit including a separating tank having a filtering bag for receiving the foreign material and removing it from the backwash flow, and for then returning the backwash flow into the pool through the return line of the filtering circuit, or back to the pump inlet; (2) by providing suitable multiple valve means for normally directing a filtering flow from the pump through the filter and back to the pool return, and, in its alternate position, directing a backwash flow through the filter and then through the separating tank; and (3) by providing a servomotor for reversing the valve means in successive half-cycles of operation, a pressure-responsive switch for initiating the reversal from normal filtering operation to backwash operation, and a timer for initiating the return from backwash to filtering operation.

OBJECT OF THE INVENTION

The invention has as its general object to provide a swimming pool filtering system which will operate without necessity for servicing attention, by automatically purging its filter of accumulated foreign matter whenever it has reduced the flow capacity of the filter to an extent requiring purging, and then automatically restoring normal filtering operation. Specific objects are:

1. To provide such a system which is relatively simple and uncomplicated;
2. To avoid loss of backwash water by returning it to the pool after removing the foreign matter from it;
3. To initiate backwash operation only when the clogged condition of the filter requires it;
4. To continue the backwash operation just long enough to restore the filter to maximum filtering condition.

These and other objects will become apparent in the following specifications and appended drawings, in which:

FIG. 1 is a schematic diagram of a filtering system embodying the invention;

FIG. 2 is an axial sectional view of the filter unit; and

FIG. 3 is a fragmentary diagram of a modified form of the invention.

DESCRIPTION

Referring now to FIG. 1 of the drawing, I have shown therein, as an example of a filtering system embodying the invention, a sand filter F for removing floating debris from a filtering flow of water drawn from a body of water W in a pool through a skimmer S and/or drain outlet of the pool by a pump P, pumped into the top of the filter, filtered downwardly through a sand bed in the filter, and then returned to the pool from the bottom of the filter through a pool return R; a separating tank D for collecting the debris when backwashed out of the filter by reverse flow upwardly through the sand body; a piston type valve V for directing normal filtering flow when in one position and for directing backwash flow when in an alternate position; an eccentric E for reversing the valve in a half-cycle of operation; a servomotor M for operating the eccentric; a pressure-responsive switch S1 for initiating reversal from normal filtering to backwash operation; a timer T for initiating return from backwash to normal filtering operation through a switch S2, which is normally open and closes at the end of the timed period of operation of timer T; and a pair of normally closed limit switches S3 and S4 for terminating the respective half-cycles of operation of eccentric E so as to accurately determine the respective positions of valve V.

Filter F (FIG. 2) comprises a cylindrical housing 10 having top 11 and bottom 12; a filtering inlet 13 connected by a rising tube 14 and lateral tube 15 to an overdrain distributing head 16 adjacent top 11; an underdrain disc 17; a bed of filtering sand 18 contained in the housing and having an upper surface disposed a short distance below the overdrain head 16; and an outlet 19, mounted in bottom 12 and connected to disc 17 for withdrawing water from the sand bed 18 and discharging it from the filter.

The filtering circuit includes a line 20 extending from pump P to valve V, a line 21 extending from valve V to the filter inlet 13, a line 22 extending from filter outlet 19 to valve V, and a line 23 extending from valve V to pool return R. The flow in this circuit is indicated by broken arrows.

The backwash circuit (in which flow is indicated by full line arrows) includes the line 20, the line 22 (conducting reverse flow to outlet 19) the line 21 (conducting reverse flow from inlet 13 to valve V) a line 24 which optionally can include a sight glass 48 for viewing the condition of the water, from valve V to the top of separating tank D, and a line 25 from the bottom of tank D to return line 23.

Tank D includes an imperforate housing 30 and a removable collecting and filtering bag 31 suspended from a removable cover 32, which may be of clear plastic material to permit visual inspection of the condition of bag 31 for determining when the bag needs to be emptied and cleaned. Filtering-collecting devices are well known in applications such as swimming pool lint pots and vacuum cleaners, and hence tank D is shown only by schematic illustration. The bag 31 can be readily removed to empty the debris etc. transferred to it from filter F.

Valve V comprises a casing cylinder 35 having an inlet port 36 connected to pump line 20, a bottom outlet port 37 connected to return line 23, a top outlet port 38 connected to line 24, an upper filter port 39, connected to line 21, below the level of top outlet port 38, and a bottom filter port 40, connected to line 22, above the level of bottom outlet port 37. A pair of valve pistons 41 and 42, carried on a stem 43, are slidable in cylinder 35 from lower limit (backwash) positions, shown in full lines, in which inlet 36 is connected to bottom filter connection 40, upper filter connection 39 is connected to top outlet 38, return line 23 is cut off from filter outlet line 22, and inlet 36 is cut off from upper filter connection 39 to line 21; to upper limit (filtering) positions, shown in broken lines, in which inlet 36 is connected to upper filter connection 39, lower filter connection 40 is connected to pool return line outlet 37, lower filter connection 40 is cut off from inlet 36, and upper valve outlet 38 is closed, thus isolating the tank D.

On the upper end of stem 43 is a slotted head 45 which cooperates with eccentric E to shift valve stem 43 axially in response to rotation of eccentric E. Head 45 has a switch actuator projection 46.

Eccentric E comprises a rotatable element 50 having an eccentric drive pin 51 engaged in the slot of head 45. Rotation of 180° (half-cycle) will shift valve stem 43 to one limit position, and rotation of a second half-cycle will return the stem 43 to its starting position. Eccentric E is driven by motor M through a drive connection 52.

Pressure switch S1 is connected, at 55, to upper filter line 21 so as to sense the back pressure, during normal filtration, in the top of the filter, opposing the pump discharge pressure. Switch S1 is normally open and closes in response to filter back pressure when it rises to the limit at which purging of the filter is required. When closed, it completes a starting circuit from one side of a power source 110 VAC through conductors 60, 61, 62, 63, 64 and 65 to limit switch S4, which is a normally closed switch and is closed when valve V is in normal filtering (broken line) position. From switch S4, the starting circuit is completed through a conductor 66 to one side of motor M, the other side of which is connected by a conductor 67 to source 110 VAC. As eccentric E approaches the end of its half-cycle of rotation (the position shown) switch S4 will be opened by engagement of actuator projection 46 against the blade of the switch.

Switch S1 will remain closed only so long as the pressure in filter line 21 remains at the high limit which has effected its closing and thus has triggered the initial energizing of the starting circuit. However as valve V is shifted from its normal filtering position (broken lines) toward its reversed position (full lines) the valve disc 41 will release the high pressure by uncovering port 39, allowing pressure to escape into lower pressure line 24, before the reversal of the valve has been completed. Hence a holding circuit, shunting the pressure switch S1, is established by the closing of switch S3, which occurs before port 38 is connected to port 39. This holding circuit extends from conductor 60 through switch S3 to conductor 63, in parallel with switch S1 and conductor 62, the remainder of the circuit being the same as the starting circuit described above. It may be noted that conductor 63 is connected to one contact of switch S1 as well as to conductor 62 which connects it to one contact of switch S1.

Timer T embodies a clockwork mechanism which can be mechanical or electrical; an external clutch; a clutch-operating solenoid 69 for engaging the timer mechanism to a switch actuator for a set time; and a pair of contacts constituting the timer switch S1 which is operated by such actuator. Solenoid 69 is connected to starting circuit conductor 63 and thus through pressure switch S1 to one side of power source 110 VAC; and by a conductor 68, shunting the motor M, to the other side of the source. Thus it is in parallel with motor M in the starting circuit, and is activated simultaneously with the starting of the reversing half-cycle of motor M.

Switch S2 operates a return-starting operation which is continued by reclosing of switch S4 as hereinafter more fully described. Switch S2, which is normally open, is mechanically linked to (or a part of) timer T as indicated schematically at 70, so as to be closed by the timer at the end of its period of timed operation, its contacts being connected, by conductors 71 and 72, between conductors 65 and 66, in parallel with switch S4, so as to set up a return starting circuit which is maintained, during the early stage of a second half-cycle cycle of operation of motor M (shifting valve V from its backwash position-full lines-back toward its normal position) until valve S4 recloses. Thereafter, timer T reopens switch S2 in a resetting of the timer to normal condition awaiting another timer-starting operation by solenoid 69. Such timers are well known in the art, an example being Paragon Electric Co. Inc. Model 536 Series timers.

OPERATION

In normal filtering operation, when valve 41, 42 is in its upper limit position indicated in broken lines, filtering flow, also indicated in broken lines, is from pump P into filter F through its inlet connection 13 to head 16 and thence downwardly through sand bed 18 to bottom connection 19 and to pool return R. Pressure-responsive switch S1 and limit switch S3 are open, limit switch S4 is in its normally closed position, and timer switch S2 is in its normally open position.

When back pressure rises to limit value calling for a backwash operation, pressure-responsive switch S1 closes, completing a starting circuit from power source 110 VAC through conductor 61. Motor M will then operate to rotate eccentric E a half revolution, shifting valve V to backwash (full-line) position, allowing switch S3 to self-close, and subsequently opening switch S4, (and the starting circuit) to terminate this half-cycle of eccentric rotation. Switch S3, being in parallel with pressure switch S1, provides a holding circuit which maintains the operation of motor M to complete the half-cycle of operation of motor M independently of switch S1, which normally will open in the meantime due to drop in pressure in filter inlet line 21 when valve disc 41 has shifted toward its full line position sufficiently to vent the port 39 to port 38.

The closing of limit switch S3 closes a circuit from source 110 VAC to timer T including conductors 60 and 63, solenoid 69, and conductors 68 and 67. Timer T will then operate for the predetermined backwash period, all other electrical circuits remaining open, and the valve V remaining in the backwash position. At the end of this period, timer T will close switch S2, establishing a return-reversing circuit from source 110 VAC to motor M through conductor 60, normally closed limit switch S3, conductors 63 and 64, switch S2, and conductors 71, 72, 66 and 67. Timer T will automatically reset itself. Motor M will then operate to rotate eccentric E in a second half-cycle of operation in which valve V is restored to normal filtering position, valve S4 is allowed to self-close so as to set up the starting circuit for the next cycle of operation, and, at the end of this half-cycle of return to normal filtering operation, the limit switch S3 is opened to deactivate the return circuit.

FIG. 3 discloses a modified arrangement in which the backwash flow can be returned directly to the inlet of pump P by separating tank outlet line 25 instead of being returned to the pool. In other respects, the system of FIG. 3 is the same as that of FIGS. 1 and 2.

We claim:

1. In a swimming pool filtering system, in combination:
   a filter comprising a housing and a filtering bed therein, said housing having an inlet and an outlet for normal filtering flow therethrough;
   a separating tank for receiving and collecting foreign material backwashed out of said filter by reverse flow therethrough, said tank having an inlet and an outlet;
   a circulating system including a unidirectional flow pump for normally circulating a filtering flow of water from said pool to said filter inlet and from said filter outlet to a return to said pool;
   a reversing valve having connections to said pump, said filter, said return and said separating tank such that in a normal filtering position of said valve it will direct said filtering flow through said filter, and in a reversed position of said valve it will direct a backwash flow through said filter and through said separating tank for backwashing foreign material from said filter and collecting it in said tank;
   valve operating means for shifting said valve from its normal filtering position to its reversed position and back to its normal filtering position; and control means including:
      1. a device sensing the pressure in said filter and initiating the shifting of said valve to said reversed position when said pressure rises to a predetermined upper limit due to accumulation of foreign material in said filter;
      2. a timer operable to start a timing operation in response to said valve-shifting to reversed position and, at the end of said timing operation to initiate return shifting of said valve from its backwash position to its normal position; and
      3. limiting means for arresting operations of said valve-operating means at the ends of respective half-cycles of its operation so as to leave the valve in its respective backwash and normal filtering positions;
   said pump operating continuously during operation of said control means and independently thereof.

2. A filtering system as defined in claim 1, said valve-operating means including an electric servomotor;
   and said limiting means including respective limit switches mechanically operated by said valve-operating means to deenergize said motor when said valve arrives at its backwash and normal filtering positions respectively.

3. A filtering system as defined in claim 1, wherein said valve comprises:
   a cylindrical casing having an intermediate inlet receiving the discharge of said pump, a first outlet at one end of said casing directing the flow to said separating tank inlet, a first port, between said inlet and said first outlet, connected to said filter inlet, a second outlet at the other end of said casing, for directing flow to said pool return, a second port, between said inlet and said second outlet, connected to said filter outlet;

and a piston valve, including axially spaced first and second pistons, slidable axially in said casing between normal positions wherein said first piston blocks flow between said first port and said first outlet while directing flow from said inlet to said first port and said second piston directs flow from said second port to said second outlet while blocking flow between said inlet and said second port, and backwash positions wherein said first piston directs backwash flow from said first port to said first outlet while blocking flow between said inlet and said first port, and said second piston blocks flow between said second port and said second outlet while directing flow from said inlet to said second port.

4. A filtering system as defined in claim 1, wherein said separating tank outlet is connected directly to said pool return.

5. A filtering system as defined in claim 1, wherein said separating tank outlet is directly connected to the inlet of said pump.

6. A filtering system as defined in claim 1, wherein said separating tank has its inlet connected to said valve so as to receive its sole inlet flow directly from said valve.

7. A filtering system as defined in claim 1, wherein said separating tank has its inlet connected to said valve so as to receive its sole inlet flow directly from said valve; and its outlet connected directly to said pool return so as to deliver its discharge into the pool.

8. A filtering system as defined in claim 1, including:
a timer switch operable under the control of said pressure sensing means to start the timing operation of said timer during said valve-shifting to reversed position;
and a return-starting switch actuated by said timer at the end of said timing operation, to initiate the operation of said valve-operating means for shifting said valve from said reversed position back to said normal filtering position.

9. A filtering system as defined in claim 1:
said sensing device including a pressure-sensitive starting switch;
said valve operating means including an electric motor started in response to closing of said starting switch;
a holding switch actuated by initial operation of said motor to continue the operation of said motor to the point where said valve is reversed, whereby said starting switch may open in response to pressure drop without arresting the operation of said motor;
and a timer switch operable in response to said actuation of said holding switch, to start the operation of said timer.

10. A filtering system as defined in claim 9:
and a return-starting switch actuated by said timer at the end of said timing operation, to initiate the operation of said valve-operating means for shifting said valve from said reversed position back to said normal filtering position.